United States Patent

Claussen et al.

[11] Patent Number: 5,958,596
[45] Date of Patent: Sep. 28, 1999

[54] COMPOSITE MATERIAL

[75] Inventors: Uwe Claussen, Leverkusen; Hanns Peter Müller, Odenthal; Walter Uerdingen, Leverkusen, all of Germany

[73] Assignee: Bayer Aktiengesellschaft, Leverkusen, Germany

[21] Appl. No.: 08/801,540

[22] Filed: Feb. 18, 1997

[30] Foreign Application Priority Data

Feb. 21, 1996 [DE] Germany ............................ 196 06 386

[51] Int. Cl.$^6$ ...................................................... B32B 17/06
[52] U.S. Cl. .......................... 428/426; 428/213; 428/215; 428/332; 428/334; 252/585; 501/13
[58] Field of Search .............................. 252/585; 501/13; 428/426, 213, 215, 332, 334

[56] References Cited

U.S. PATENT DOCUMENTS

| | | | |
|---|---|---|---|
| 4,865,668 | 9/1989 | Goepfert et al. | 156/74 |
| 5,047,272 | 9/1991 | Hassel et al. | 428/40 |
| 5,051,286 | 9/1991 | Starzewski | 428/500 |
| 5,073,014 | 12/1991 | Ostoja-Starzewski | 359/490 |

FOREIGN PATENT DOCUMENTS

| | | | |
|---|---|---|---|
| 100705 | 2/1984 | European Pat. Off. | B32B 17/10 |
| 4227522 | 2/1994 | Germany | G02B 1/04 |
| 2144760 | 3/1985 | United Kingdom | G02B 5/30 |

*Primary Examiner*—Richard Weisberger
*Attorney, Agent, or Firm*—Sprung Kramer Schaefer & Briscoe

[57] ABSTRACT

A process in which a dye film is cast, the film is peeled off from the substrate and stretched monoaxially, the stretched film is applied to a glass film, and the resultant laminate is conditioned at elevated temperature gives composite materials which are highly suitable for the production of opto-electronic instruments.

5 Claims, No Drawings

COMPOSITE MATERIAL

COMPOSITE MATERIAL

The invention relates to a composite material comprising glass and optically anisotropic polymer film, to a process for the production of this composite material, and to the use of this material for the production of optoelectronic elements, such as, for example, LCDs (=liquid crystal displays).

The function of LCDs is based on the interaction of optically anisotropic layers (usually in the form of polarization films), which cause linear polarization of light passing through them, and liquid-crystal layers. By applying an electrical voltage, the refractive index of the liquid-crystal layer can be modified; this modification causes a rotation of the plane of vibration of the polarized light, and this rotation, given a suitable arrangement of liquid-crystal layer and optically anisotropic layer, results in a change in the bright or dark effect. If, for example, a liquid-crystal layer is included between two polarization films aligned parallel to one another, the arrangement appears brighter or darker at local resolution depending on the orientation of the plane of vibration of the linear-polarized light, i.e. depending on the local birefringence.

In current practice, the cells containing the liquid-crystal layer and the polarization films are manufactured separately, and the polarization films are subsequently bonded, as planar polarizers, to the glass surfaces of these cells.

The most common polarization films at present are iodine films, which contain iodine as light-polarizing agent and can have dichroic ratios of greater than 50. The dichroic ratio D of a compound is characterized by the quotient $E_{parallel}/E_{perpendicular}$, where E is the extinction and the index "parallel" denotes that the alignment of polarized light and the transition moment of the chromophores are parallel. The maximum adsorption occurs in this state. The index "perpendicular" denotes correspondingly that the two directions are arranged perpendicular to one another, and the extinction becomes minimal. D is dependent on the concentration. The iodine films are usually produced by diffusion of iodine out of an aqueous solution containing the iodine in monomeric and isotropic form into the surface of a stretched and therefore ordered, uncoloured polymer film, preferably made from polyvinyl alcohol. During this operation, the iodine polymerizes in chain form with formation of an anisotropic material and at the same time undergoes a jump-like change in properties, including its diffusibility. A very steep concentration gradient from the surface into the interior of the film is therefore obtained. This process thus produces films of which only the outer layers are coloured, i.e. the intensity of colour is independent on the film thickness. Typical top-quality commercially available iodine-containing polarization films have thicknesses of from 20 to 40 $\mu$m, with iodine-containing layers having a thickness of less than 5 $\mu$, i.e. the majority of the film is ineffective in producing polarized light acting virtually only as carrier material.

So that the films can be transported through the iodination bath, they must withstand the mechanical loads which occur during this operation. Besides the tensile strength, which is increased by stretching, it is primarily the thickness of the film that affects mechanical stability, i.e. the thickness cannot drop below a certain value if the films are to be self-supporting. On the other hand, it is desired to minimize the film thickness in order substantially to avoid undesired effects such as light scattering and refraction.

Iodine films have the disadvantage that the iodine chains have low resistance to dry and in particular to moist heat: the iodine chains break, which means that iodine films have inadequate fastness properties. They can therefore neither be processed at elevated temperatures nor used outside for an extended period. It is of colouristic importance that the grey-blue colour of iodine basically cannot be varied and suffers a shift in shade during degradation owing to ageing.

The problems of iodine films are for the most part not shared by dye films. These are produced using dyes which are optically anisotropic (dichroic) from the very beginning. Dye films can be produced by the same diffusion colouring process as iodine films, the dyes diffusing into the swollen regions of the stretched and thus ordered polymer film, Since this is not accompanied by jump-like changes in property, intensely coloured polarization films of high polarization performance cannot hitherto be produced by this process.

Regarding the mechanical loads on the films in the dyebath, that stated above for the iodine films applies analogously. One theoretical possibility for the production of thin dye films which are uniformly coloured through is the casting process. This allows any desired colour densities and very good dichroic values comparable to those of iodine films. The macroscopically acceptable dichromaticity is caused here by the stretching of the coloured film. However, simple stretching does not give a dimensionally stable material if the films are very thin; instead, additional conditioning in order to set the stretched state is needed. In the case of very thin films, however, this conditioning results in extreme brittleness and consequently undesirably low tear strength. Films treated in this way can only be handled with great difficulty.

A way which is promising per se for producing a flexible base material for continuous production of LCD cells was the attempt to replace the glass by a suitable plastic. However, it has been found that plastics are not sufficiently stable on extended contact with liquid crystals, in particular at elevated temperature.

The object of the invention was thus to provide a process for the production of polarization films which satisfy the minimum requirements regarding mechanical, thermal and chemical stability.

The invention relates to a laminate consisting of

A. a glass film having a thickness of from 10 to 200 $\mu$m, preferably from 20 to 100 $\mu$m, and B. a dichroic dye film having a thickness of from 5 to 60 $\mu$m, preferably from 8 to 30 $\mu$m, whose extinction in linear-polarized light, measured on two superimposed films at the absorption maximum, is from 0.1 to 6.0, preferably from 2.0 to 4.5, in the case of optical axes perpendicular to one another and from 0.03 to 0.2 in the case of parallel optical axes.

The glass film A consists of mineral glass; it can be alkali-free, which is preferred owing to the electrical properties.

The organic polymer is one which forms transparent films, can be oriented by stretching and is compatible with dyes containing acidic groups. Examples of such polymers are polyamides, cellulose esters, such as cellulose acetate, vinyl acetate homopolymers and copolymers, where the comonomers are ethylene, propylene, crotonic acid, (meth) acrylic acid, maleic acid and other comonomers which can be copolymerized with vinyl acetate, and polyvinyl alcohols.

Suitable polyvinyl alcohols are all those produced by full or partial hydrolysis of polyvinyl acetate, in particular polyvinyl alcohols (PVALs) in which from 90 to 100 mol %, preferably from 95 to 100 mol %, of all copolymerized monomer units of the polymer are vinyl alcohol units. The remainder to 100 mol % of all monomer units consists of monomer units such as ethylene, vinyl acetate, vinyl trifluoroacetate and other comonomer units which are known for such copolymers. Preference is given to polyvinyl alcohols. These are, in particular, grades which, in 4% strength by weight aqueous solution, have a viscosity of greater than 4 mPa.sec$^2$, preferably from 20 to 70 mPa.sec$^2$, at 20° C.; they have a degree of hydrolysis of greater than 80 mol %, preferably from 85 to 100 mol %.

Suitable dyes for the dye films B are all dyes which impart on the films the properties defined in the claims, i.e. they must render the stretched film dichroic. The macroscopically perceptible dichromaticity is based on the ordering of dichroic, microscopic particles. These can be added externally to the polymer in finished form, for example as pigments, or only form during the film production process. Preference is given to the latter variant, which utilizes the ability of certain molecules to undergo association. In the colouristic field, this property is described approximately by the term substantivity (H. R. Schweizer, Künstliche organische Farbstoffe und ihre Zwischenprodukte [Artificial organic dyes and their intermediates], Springer Verlag, Berlin (1964), pp. 481 ff.).

Suitable dyes belong to the direct dye group. They preferably contain the groups

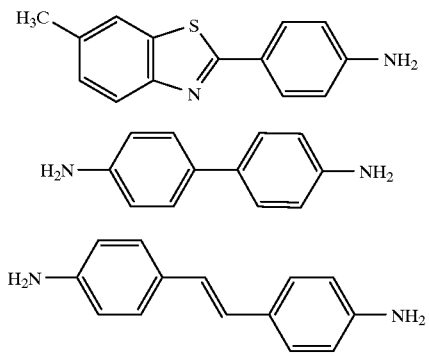

or derivatives thereof, for example

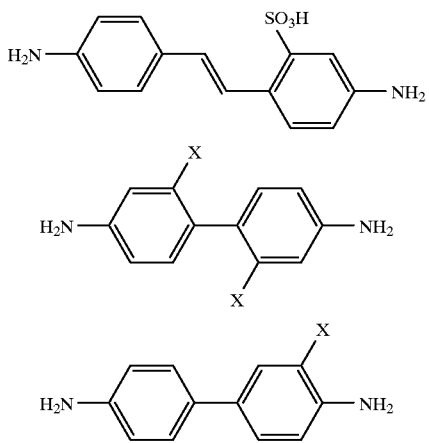

-continued

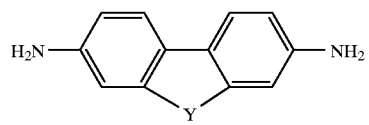

in which X is a sulpho group, and Y is SO$_2$, NH or CH$_2$. I-acid is particularly suitable as the diazo component. It is advantageous to double the compounds via the amine group with the radical of a dicarboxylic acid or to employ the metal complex compounds, preferably Cu complexes.

For the purposes of the present invention, the term "dye" covers all compounds which absorb in the visible wavelength region of the light, i.e., for example, polyenes, such as polyacetylene and preferably dyes in the narrower sense. Preferred dyes are described, for example, in DE-OS (German Published Specification) 36 15 765, 41 03 346, 42 27 521 and 42 27 522; cf. also the literature cited therein.

The dyes can be added to the polymer in any desired form which allows homogeneous distribution; usually, the dyes are added to the molten or dissolved polymer before the film is produced from the dye-containing polymer.

Since the films are generally no longer self-supporting owing to their low thickness, they are generally cast onto a support material from solution, preferably from solutions having a viscosity of from 100 to 600 mPa.s (measured at 20° C.) at a temperature of from 35 to 45° C. in a wet-film thickness of from 100 to 400 µm, preferably from 200 to 300 µm, giving a dry-film thickness of from 5 to 60 µm, preferably from 8 to 30 µm, particularly preferably from 12 to 25 µm.

Suitable substrates include cellulose derivatives, such as cellulose acetate, butyrate and nitrate, vinyl polymers, such as polystyrene and polyvinyl chloride, polyesters, such as polycarbonate and polyethylene terephthalate, and so-called release paper, as employed, for example, in the "reverse process" of textile and leather coating, i.e. paper laminated with barytes or a polyolefin (for example polyethylene, polypropylene or ethylene-butadiene copolymer).

The casting solutions (aqueous in the case of polyvinyl alcohol) preferably contain from 5 to 10% by weight, based on the solution, of polymer and from 0.1 to 6% by weight, in particular from 0.5 to 4% by weight, based on the solids content, of dye.

The casting solutions can also contain synergists which increase the dichromaticity; compounds that have proven particularly effective are those which exert a precipitating action on the dissolved polymer. In the case of polyvinyl alcohol dissolved in water, suitable synergists are, for example, C$_1$–C$_4$-alcohols, such as methanol, ethanol and isopropanol. The synergists are generally employed in amounts of up to 15% by weight, based on the casting solution.

The casting solutions may furthermore contain plasticizing additives, which is particularly important for polyvinyl alcohol. Preferred plasticizing compounds include polyhydric C$_3$–C$_{12}$-alcohols having 2 to 6 hydroxyl groups per molecule, such as, for example, ethylene glycol, glycerol, trimethylolethane, trimethylolpropane, pentaerythritol, sorbitol, diethylene glycol and triethylene glycol. Mono- and di-C$_1$–C$_6$-alkyl ethers of dihydric or trihydric C$_4$–C$_{12}$-ether alcohols based on C$_2$–C$_4$-alkylene oxides, such as, for example, ethylene glycol monomethyl and monoethyl ethers, ethylene glycol dimethyl and diethyl ethers, diethylene glycol monoethyl and diethyl ethers, C$_3$–C$_{12}$- alkylamines, such as n-propylamine, $C_2$–$C_6$-hydroxylamines, such as ethanolamine and n-propanolamine, $C_3$–$C_{10}$-amides, such as dimethylformamide, N-methylpyrrolidone, pyrrolidone and ε-caprolactam, and mixtures thereof. Preferred amounts of plasticizing compounds are from 0.05 to 4% by weight, based on the polymer (solid).

It has been found that mixtures of synergists and plasticizing compounds allow the production of particularly advantageous films. Particularly preferred mixtures contain glycerol, ethylene glycol monomethyl ether, ethylene glycol dimethyl ether and/or dimethylformamide on the one hand and methanol on the other hand. Mixtures of glycerol an methanol are particularly preferred. The weight ratio between synergist and plasticizing compound is preferably from 0.1 to 10, in particular from 1 to 5.

In order to improve the wetting, the casting solutions can contain surface-active compounds, as described, for example, in "Methoden der Organischen Chemie" [Methods of Organic Chemistry] (Houben-Weyl), 4th Edn., Vol. XIV/1, Georg Thieme Verlag, Stuttgart, 1961, p. 190 ff.

Preferred surface-active compounds include, for example, $C_8$–$C_{18}$-n-alkylsulphates, $C_8$–$C_{18}$-n-alkylbenzenesulphonates, $C_8$–$C_{18}$-n-alkyltrimethylammonium salts, n-di-$C_8$–$C_{18}$-alkyldimethylammonium salts, $C_8$–$C_{18}$-n-alkylcarboxylates, $C_8$–$C_{18}$-n-alkyldimethylamine oxides, $C_8$–$C_{18}$-n-alkyldimethylphosphine oxides and preferably oligoethylene glycol mono-$C_6$–$C_{18}$-alkyl ethers having an average of from 2 to 30 ethoxy groups per molecule. The n-alkyl radicals can also be replaced by partially unsaturated linear aliphatic radicals. Particularly preferred surface-active compounds are oligoethylene glycol mono-$C_{10}$–$C_{14}$-alkyl ethers having an average of 4 to 12 ethoxy groups per molecule, in particular oligoethylene glycol mono-$C_{12}$-alkyl ethers having an average of 8 ethoxy groups per molecule.

Particularly preferred surface-active compounds include sulphonic acids, such as alkanesulphonic acids, in particular octyl sulphosuccinate, perfluoroalkanesulphonic acids, in particular perfluorooctanesulphonic acid and its tetraalkylammonium salt, for example the tetraethylammonium salt, sulphates, in particular sulphated alkylphenol polyglycol ethers or alkylsulphonates, amphoteric surfactants, in particular alkaneamidopropylbetaines, for example lauramidopropylbetaine, or the compounds with the following registry numbers listed in CA: 73772-45-9, 96565-37-6, 4292-10-8, 59272-84-3, 25729-05-9, 6179-44-8, 21244-99-5, 58793-79-6, 32954-43-1, 92836-76-5, or nonionic surfactants, such as 4-octylphenol polyglycol ether.

The casting solutions can contain the surface-active compounds in amounts of from 0.001 to 1% by weight, preferably from 0.005 to 0.1% by weight, based on the casting solution.

After casting, the wet film is dried, preferably in a stream of gas, in particular in a stream of air. The isotropic extinction of the unstretched films can be from 0.1 to 3.5, preferably from 0.5 to 3.0, measured at the absorption maximum. The film can then be peeled off from the substrate and stretched. The stretching is preferably carried out at elevated temperature, for example at from 90 to 180° C. The stretching ratio is preferably from 4:1 to 8:1.

The stretched film can be pressed or melted onto the glass.

The dimensions of the polarization film are unstable immediately after stretching, since the film relaxes with loss of optical quality. It can be set with retention of its properties by conditioning under tension at temperatures between 150 and 250° C. This may be connected with a drying-out process, which results in extremely easy fibrillation of the web, resulting in its becoming unusable. In this state, the material can only be handled with great difficulty, since the sensitivity to mechanical load perpendicular to the tensile direction is considerable.

This instability can be overcome effectively by either coating the glass film or the stretched film before conditioning with an adhesive, which holds the film on the glass during the conditioning process. Preference is given to a thermoplastic adhesive which softens at the conditioning temperature, hardens after cooling and permanently bonds the system. Preferably suitable here are polyurethane-based adhesives, as described, for example, in DE-AS (German Published Specification) 26 44 434.

The set film is highly heat-resistant and only limited in its optical properties by the thermal stability of the polymer.

The invention thus also relates to a process for the production of the above laminates, in which a dye film having a dry film thickness of from 5 to 60 μm, preferably from 8 to 30 μm, is cast onto a support, the film is peeled off from the substrate and stretched monoaxially in a ratio of from 4:1 to 8:1, the stretched film is pressed, melted or bonded onto a glass film, and the resultant laminate is conditioned at a temperature of rom 150 to 250° C.

After the two films have been combined, the laminate has two surfaces of different types. The polarization film can be covered as desired. Mention may be made by way of example of bonding to a second film of mineral glass or an optically isotropic plastic, which is expensive, but may be advantageous in certain cases, for example if the exclusion of water or oxygen is strictly required. Preference is given to coating with a transparent lacquer, reactive lacquers being preferred.

The glass side of the composite can be processed further in a conventional manner, but temperatures of above 250° C. should be avoided. For this reason, it has been found advantageous to provide the glass side in advance with thermally demanding finishes, for example with alignment or conductivity layers.

It is a particular advantage of the novel composite material that it can be wound up. It can be processed from the roll or in pieces.

The thickness and thus also the weight of novel composite material is determined by the thickness of the cover glass. Very thin qualities, for example 50 μ, enable the production of display structures whose total thickness is smaller than that of a single polarizer of conventional structure. Weights and layer thicknesses are in hitherto unachieved small orders of magnitude.

The novel composite material can furthermore be combined easily with the materials of the conventional production process.

The material is used for the production of two-dimensional display devices operated by polarized light, preferably displays.

The invention thus furthermore relates to the use of this composite material for the production of optoelectronic instruments.

The percentages in the examples below relate to the weight.

EXAMPLES

Example 1

An 8% strength aqueous PVA solution (PVA=polyvinyl alcohol) contains 1.875% (based on PVA; content 90% of active ingredient) of the cyan dye of the following formula:

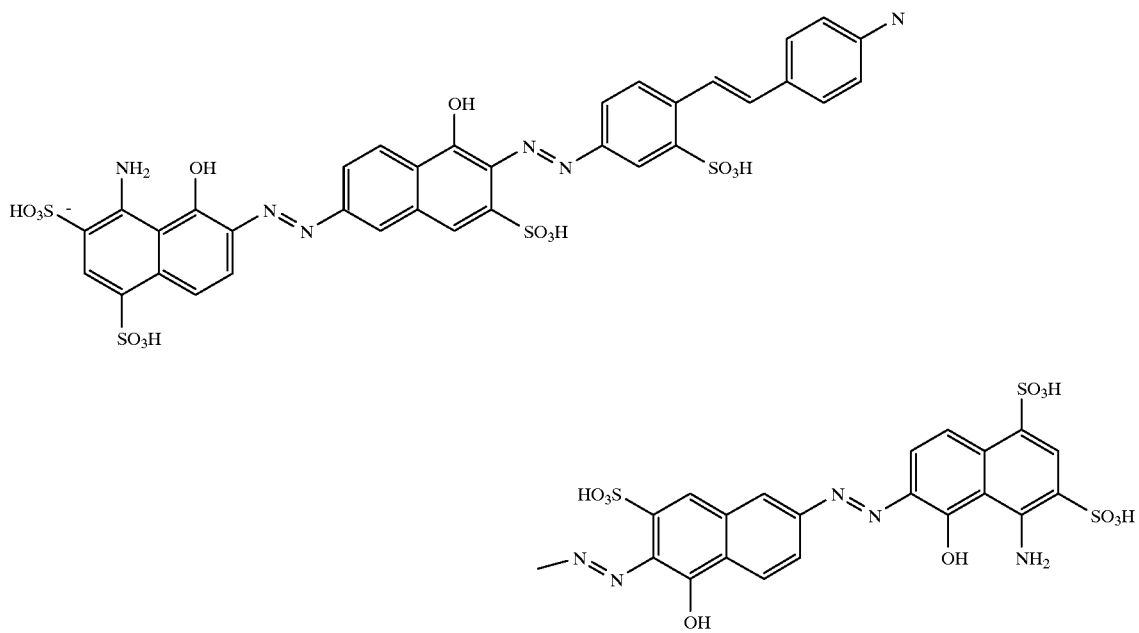

and an anionic surfactant (Saponin, 4% strength, aqueous; 20 ml/l casting solution). The dye is prepared in accordance with DE-OS (German Published Specification) 41 03 346, Example 4. A web having a wet thickness of 268 $\mu$m is cast from a solution having a viscosity of 190 mPa.s at 35° C. onto 120 $\mu$m cellulose triacetate. After drying, the coating has a thickness of 18 $\mu$m. The web is stretched in a ratio of 4.5:1 at 140° C. and wound up.

A cover glass (format 100×200 mm with a thickness of 100 $\mu$m) is knife-coated with a 3% strength adhesive solution (prepared as described in Example 1 of DE-OS (German Published Specification) 26 44 434 and employed as a solution in methylene chloride), and the adhesive coating is dried for 10 minutes at 200° C. A matching piece of the polarizer web is applied to the cover glass under tension and pressed on using a roll. The combination is heated at 210° C. for 10 minutes, forming the composite. After cooling, the side with the PVA film is sealed by means of a lacquer, giving a flexible, very thin polarizer film.

Examples 2 TO 4

Similar results as in Example 1 are obtained if the dye of Example 1 is replaced by 2) the dye (magenta) prepared in accordance with Example 1 of DE-OS (German Published Specification) 42 27 521,
3) the dye (yellow) prepared in accordance with Example 3 of DE-OS (German Published Specification) 42 27 522, and
4) a mixture of cyan/magenta/yellow in the weight ratio 1:0.2:0.8.

We claim:

1. Laminate consisting of
   A. a glass film having a thickness of from 10 to 200 $\mu$, and
   B. a dichroic dye organic polymer film having a thickness of from 5 to 60 $\mu$m whose extinction in linear-polarized light, measured on two superimposed films at the absorption maximum, is from 0.1 to 6.0 in the case of optical axes perpendicular to one another and from 0.03 to 0.2 in the case of parallel optical axes.

2. Laminate according to claim 1, whose dye film B has a thickness of from 9 to 30 $\mu$m.

3. Laminate according to claim 1, where the extinction of the dye film B in linear-polarized light, measured on two superimposed films at the absorption maximum, is from 2.0 to 4.5 in the case of optical axes which are perpendicular to one another.

4. Process for the production of the laminates according to claim 1, in which a dye film having a dry film thickness of from 10 to 35 $\mu$is cast onto a support, the film is peeled off from the substrate and stretched monoaxially in a ratio of from 4:1 to 8:1, the stretched film is pressed, melted or bonded onto a glass film, and the resultant laminate is conditioned at a temperature of from 150 to 250° C.

5. An optoelectronic instrument comprising a laminate according to claim 1.

* * * * *